(12) United States Patent
Aoki et al.

(10) Patent No.: US 11,748,852 B2
(45) Date of Patent: Sep. 5, 2023

(54) PIXEL INTERPOLATION DEVICE AND PIXEL INTERPOLATION METHOD, AND IMAGE PROCESSING DEVICE, AND PROGRAM AND RECORDING MEDIUM

(71) Applicant: Mitsubishi Electric Corporation, Tokyo (JP)

(72) Inventors: Toru Aoki, Tokyo (JP); Miki Sugano, Tokyo (JP); Masako Asamura, Tokyo (JP); Yoshitaka Toyoda, Tokyo (JP); Kohei Kurihara, Tokyo (JP); Daisuke Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 429 days.

(21) Appl. No.: 16/973,041

(22) PCT Filed: Jun. 27, 2018

(86) PCT No.: PCT/JP2018/024444
§ 371 (c)(1),
(2) Date: Dec. 8, 2020

(87) PCT Pub. No.: WO2020/003422
PCT Pub. Date: Jan. 2, 2020

(65) Prior Publication Data
US 2021/0272241 A1 Sep. 2, 2021

(51) Int. Cl.
*G06T 5/00* (2006.01)
*G06T 3/40* (2006.01)
*H04N 23/84* (2023.01)

(52) U.S. Cl.
CPC ............ *G06T 5/002* (2013.01); *G06T 3/4007* (2013.01); *H04N 23/843* (2023.01); *H04N 2209/046* (2013.01)

(58) Field of Classification Search
CPC ....... G06T 5/002; G06T 3/4007; G06T 5/005; G06T 3/4015; G06T 5/20; G06T 3/0056;
(Continued)

(56) References Cited

U.S. PATENT DOCUMENTS

| 7,379,105 B1* | 5/2008 | Frank .................. H04N 7/0135 348/E7.012 |
| 2004/0032516 A1* | 2/2004 | Kakarala ............... G06T 3/4015 382/300 |

(Continued)

FOREIGN PATENT DOCUMENTS

| JP | 3767593 B2 | 4/2006 |
| JP | 3810404 B2 | 8/2006 |

(Continued)

OTHER PUBLICATIONS

International Search Report and Written Opinion dated Aug. 28, 2018, received for PCT Application No. PCT/JP2018/024444, Filed on Jun. 27, 2018, 9 pages including English Translation.

*Primary Examiner* — Jose L Couso
(74) *Attorney, Agent, or Firm* — Xsensus LLP (57) ABSTRACT

A first group of interpolation calculators performing interpolation by mean preserving interpolation calculation, and a second group of interpolation calculators performing interpolation by interpolation other than the mean preserving interpolation calculation are provided. Each of the interpolation calculators performs interpolation calculation for the missing pixel to calculate an interpolation candidate value (M(h)), and calculates test interpolation values (M(t)) treating pixels in a vicinity of the missing pixel as test pixels. A decider (4) selects one of the plurality of interpolation calculators based on results of the test interpolation. An outputter (5) selects the interpolation candidate value outputted from the interpolation calculator selected by the decider (4), among the plurality of interpolation candidate (Continued)

values (M(h)), and outputs the selected interpolation candidate value. Interpolation can be performed such that the interpolated pixel does not look unnatural, and yet the storage capacity and the data processing amount that are required are relatively small.

17 Claims, 7 Drawing Sheets

(58) Field of Classification Search
CPC ... G06T 3/00; G06T 5/00; G06T 2207/20016;
G06T 3/403; G06T 7/207; G06T
2207/10024; G06T 5/50; G06T 7/90;
H04N 23/843; H04N 2209/046; H04N
1/401; H04N 1/193; H04N 1/4097; H04N
1/40; H04N 1/00068; H04N 1/0311;
H04N 1/19; H04N 1/192; H04N 1/1934;
H04N 1/387; H04N 5/142; H04N 9/646;
H04N 7/0135; G06K 15/027; G06K
15/1872; G06V 10/7515
See application file for complete search history.

(56) References Cited

U.S. PATENT DOCUMENTS

| | | | |
|---|---|---|---|
| 2005/0041116 A1* | 2/2005 | Tsukioka | H04N 25/134 348/229.1 |
| 2005/0201616 A1* | 9/2005 | Malvar | G06T 3/4015 382/167 |
| 2006/0050990 A1* | 3/2006 | Yamanaka | G06T 5/20 382/300 |
| 2007/0070243 A1* | 3/2007 | Zhu | H04N 7/0135 348/E5.064 |
| 2007/0092156 A1 | 4/2007 | Yamanaka et al. | |
| 2007/0247530 A1* | 10/2007 | Takahasi | H04N 23/843 348/E9.051 |
| 2007/0285683 A1* | 12/2007 | Someya | H04N 1/401 358/1.9 |
| 2011/0069192 A1* | 3/2011 | Sasaki | H04N 23/843 348/222.1 |
| 2011/0279712 A1* | 11/2011 | Hayashi | H04N 23/843 348/239 |
| 2013/0272615 A1 | 10/2013 | Nakamura | |
| 2015/0339555 A1* | 11/2015 | Doi | H04N 1/40 358/1.9 |
| 2016/0284053 A1* | 9/2016 | Nishimura | G06T 11/001 |
| 2017/0039682 A1* | 2/2017 | Oh | G06T 7/90 |

FOREIGN PATENT DOCUMENTS

| | | |
|---|---|---|
| JP | 5515552 B2 | 6/2014 |
| JP | 5699621 B2 | 4/2015 |
| WO | 2005/036868 A1 | 4/2005 |
| WO | 2005/045758 A1 | 5/2005 |

* cited by examiner

PIXEL INTERPOLATION DEVICE AND PIXEL INTERPOLATION METHOD, AND IMAGE PROCESSING DEVICE, AND PROGRAM AND RECORDING MEDIUM

CROSS-REFERENCE TO RELATED APPLICATION

The present application is based on PCT filing PCT/JP2018/024444, filed Jun. 27, 2018, the entire contents of which are incorporated herein by reference.

TECHNICAL FIELD

The present invention relates to a pixel interpolation device and a pixel interpolation method, and an image processing device, and a program and a recording medium.

BACKGROUND ART

An image reading device has been realized in which an object to be read (original) is read by a one-dimensional imaging device (line sensor), and image data corresponding to the original is generated. Line sensors in which a plurality of sensor chips each having a plurality of photoelectric conversion elements are aligned in the longitudinal direction of the line sensor, and are joined together are widely used.

The sensor chips are formed by semiconductor manufacturing technology, so that the intervals between photoelectric conversion elements are relatively small. In contrast, the line sensor is manufactured by joining a plurality of sensor chips and fixing them on a board, or in a similar method. Accordingly, the interval between the photoelectric conversion elements positioned at the mutually adjacent ends of the sensor chips which are joined is relatively large. When such a line sensor is used to read the original to acquire image data, no pixel value is obtained at a position between the mutually adjacent ends of the sensor chips which are joined. It is necessary to interpolate a pixel value for such a pixel.

Also, there are situations in which the pixel value of a pixel signal obtained by reading by means of a photoelectric conversion element is incorrect or unreliable for reasons such as irregularity of the photoelectric conversion element in the sensor chip, or smear of a part which is positioned in the optical path between the photoelectric conversion element in the sensor chip and the original, and which should be transparent. Interpolation is also necessary for such a pixel value.

The pixel at a position where there is no photoelectric conversion element, and the pixel for which interpolation is necessary because the pixel value is incorrect or unreliable, or for some other reason are referred to as a pixel with a missing pixel value, or simply as a missing pixel.

Various interpolation methods have been proposed for the interpolation of the missing pixel. Patent reference 1 shows use of pattern matching for the interpolation of a missing pixel when the missing pixel is found to be in an image region in which the pixel value varies periodically.

PRIOR ART REFERENCES

Patent References

Patent Reference 1: U.S. Pat. No. 5,699,621 (Paragraphs 0037 to 0068, FIG. 2)

SUMMARY OF THE INVENTION

Problems to be Solved by the Invention

In the method disclosed in patent reference 1, it is necessary to prepare in advance an appropriate pattern for each period of the pixel value variation. If the number of patterns is insufficient, a pixel value which causes the missing pixel to look unnatural may be calculated. Increase in the number of patterns is associated with a problem of increase in the storage capacity or data processing amount.

Means for Solving the Problem

A pixel interpolation device according to the present invention comprises:
a plurality of interpolation calculators each interpolating a pixel value of a missing pixel in an input image, based on pixel values of pixels constituting said input image;
a decider; and
an outputter, wherein
each of said plurality of interpolation calculators interpolates the pixel value of said missing pixel, and outputs the interpolated pixel value as an interpolation candidate value, treats a plurality of non-missing pixels in a vicinity of said missing pixel as test pixels, interpolates a pixel value of each of said test pixels, and outputs the interpolated pixel value as a test interpolated value of the test pixel,
the interpolation of said test pixels is performed in a same interpolation method as the interpolation of said missing pixel,
said plurality of interpolation calculators include a first group of interpolation calculators, and a second group of interpolation calculators,
said first group of interpolation calculators perform the interpolation by mean preserving interpolation calculation,
said first group of interpolation calculators differ from each other in a number of pixels referenced,
said second group of interpolation calculators perform the interpolation by interpolation calculation different from said mean preserving interpolation calculation,
said second group of interpolation calculators differ from each other in at least one of an interpolation calculation method and a number of pixels referenced,
said decider calculates error index values pertaining to respective interpolation calculators, based on absolute difference values between said test interpolated values pertaining to the respective test pixels in the vicinity of each missing pixel, and the pixel values of the test pixels, and selects one of the plurality of interpolation calculators based on the calculated error index values, and
said outputter selects, for each missing pixel, the interpolation candidate value outputted from the interpolation calculator selected by said decider, among the interpolation candidate values outputted from the plurality of interpolation calculators, and outputs the selected interpolation candidate value.

Effect of the Invention

According to the present invention, it is possible to perform interpolation by which the interpolated pixel does not look unnatural, and yet the storage capacity and the data processing amount that are required are relatively small.

MODE FOR CARRYING OUT THE INVENTION

First Embodiment

Figure 1:
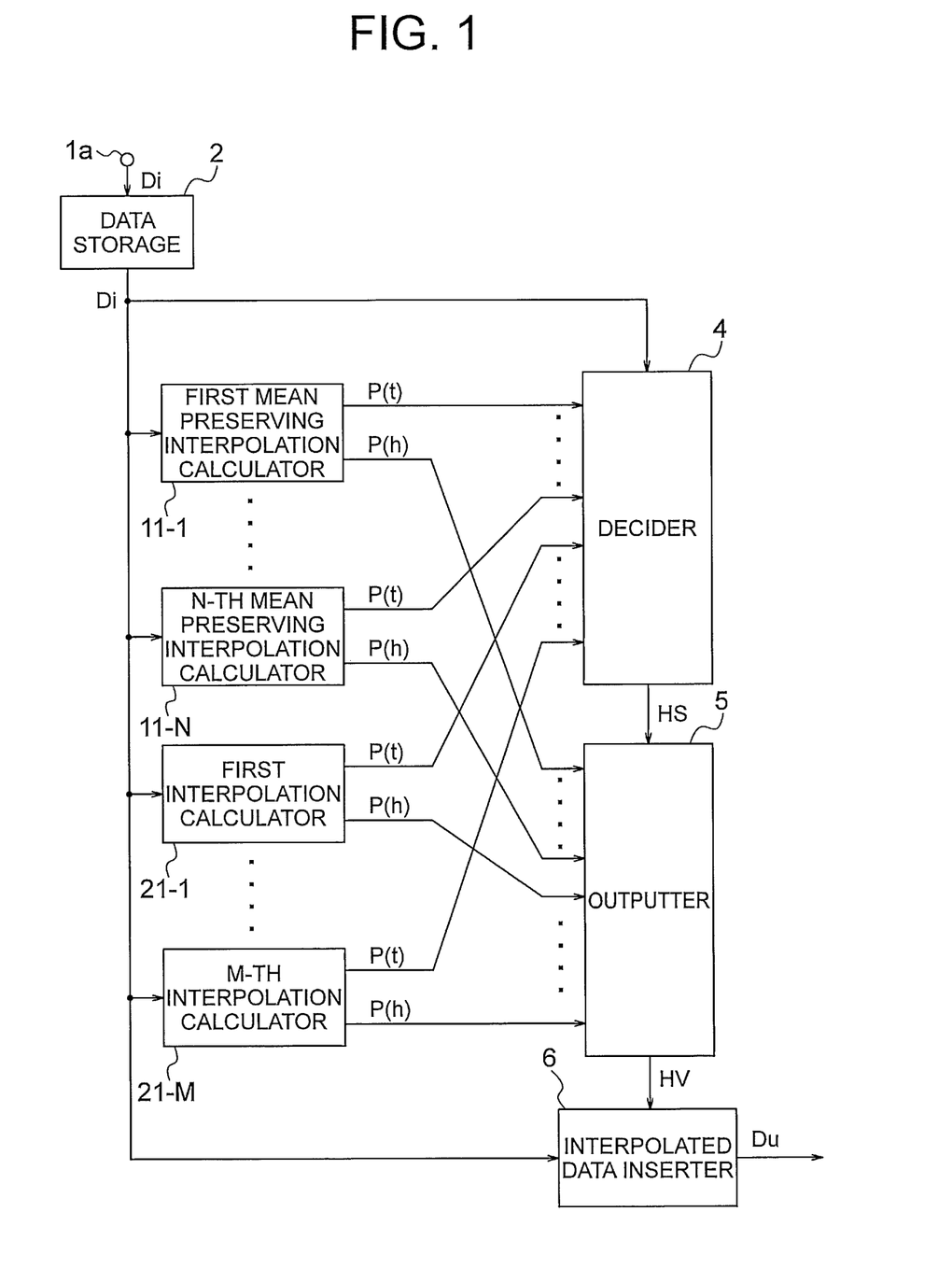
FIG. 1 is a functional block diagram schematically showing a configuration of a pixel interpolation device of a first embodiment of the present invention.

FIG. 1 is a functional block diagram schematically showing a configuration of a pixel interpolation device 1 of a first embodiment of the present invention.

The pixel interpolation device 1 interpolates pixel values of missing pixels in an image represented by image data Di supplied to an input terminal 1a.

Figure 2:
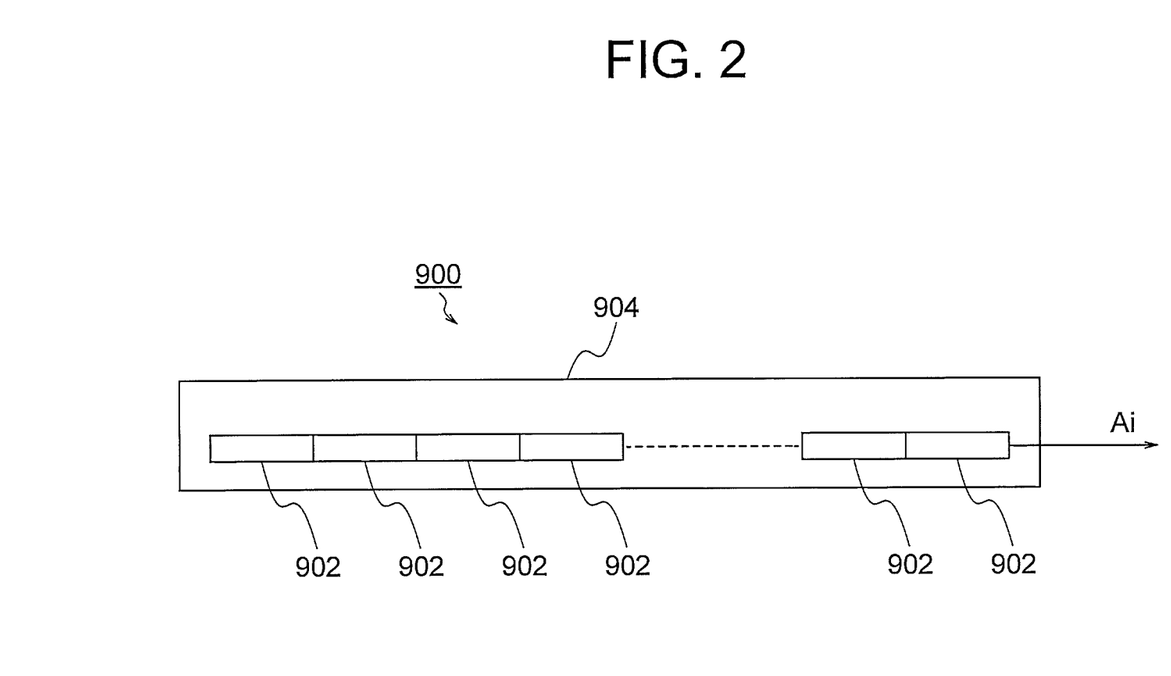
FIG. 2 is a schematic diagram illustrating a contact image sensor.

The image data Di is obtained, for example, by reading an object to be read (original) by means of an imaging device provided with a contact image sensor 900 shown in FIG. 2.

The contact image sensor 900 shown in FIG. 2 is formed by arranging a plurality of sensor chips 902 in a line on a board 904, and joining them together. The longitudinal direction of the contact image sensor 900 will be the main scanning direction.

Figure 3:
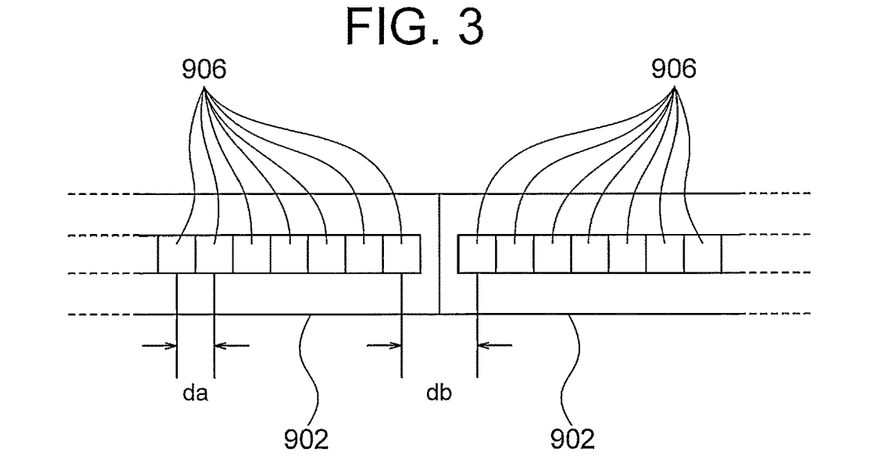
FIG. 3 is a diagram showing details of the joint part between sensor chips forming the contact image sensor shown in FIG. 2.

FIG. 3 shows, in detail, a joint part between mutually adjacent sensor chips 902.

As illustrated, each of the sensor chips 902 has a plurality of photo-electric conversion elements 906.

In each sensor chip 902, the plurality of photo-electric conversion elements 906 are disposed in a line at a constant interval da. On the other hand, the photo-electric conversion elements positioned at the adjacent ends of two sensor chips 902 which are joined are separated by a distance db. Generally, the distance db cannot be made as small as the interval da.

In that case, it is desirable that the sensor chips are so disposed that db is twice da. This is because, if such a relation holds, the interpolation process can be performed assuming a situation in which one pixel is missing between the sensor chips, making it possible to obtain an accurate result of interpolation. The following description is made on such a case.

However, db need not be twice da. It is also possible to perform the interpolation according to the ratio between da and db.

Moreover, the interpolation process described below can be applied, not only to interpolation of a pixel at a position between sensor chips where no photo-electric conversion element is present, but also to interpolation in a situation in which the pixel value of a pixel signal obtained by reading by means of a photo-electric conversion element in the sensor chip is incorrect or unreliable. The reason for the pixel value being incorrect or unreliable may be irregularity of the photo-electric conversion element or smear of a part which is in the optical path and which should be transparent.

"Missing pixels" in the following description cover pixels which are at a position where there is no photo-electric conversion element, and pixels which require interpolation for reasons of the pixel value being incorrect or unreliable. Pixels which have a pixel value and do not require interpolation are referred to as non-missing pixels.

By performing imaging by means of the contact image sensor 900 once, an image signal Ai representing an image of one line is obtained, and by analog-to-digital conversion of the image signal Ai, image data Di is obtained.

By moving the original in a sub-scanning direction with respect to the contact image sensor 900, image data Di for a plurality of lines are successively obtained.

In the following description, the image represented by the image data Di is referred to as an input image, and is denoted by the same reference characters Di. Furthermore, the pixel value represented by the image data Di is referred to as an original pixel value, and is denoted by the same reference characters Di. Similar rules apply to other images and pixel values.

The pixel interpolation device 1 can be implemented by processing circuitry. The processing circuitry can be configured of dedicated hardware, or software, or a combination of hardware and software. When it is configured of software, the pixel interpolation device is formed of a microcomputer including a CPU (Central Processing Unit), a DSP (Digital Signal Processor), or the like.

The pixel interpolation device 1 comprises a data storage 2, a plurality of interpolation calculators 11-1 to 11-N, 21-1 to 21-M, a decider 4, an outputter 5, and an interpolated data inserter 6.

The data storage 2 stores the image data Di.

The image data Di stored in the data storage 2 is read, and supplied to the plurality of interpolation calculators 11-1 to 11-N, 21-1 to 21-M, the decider 4, and the interpolated data inserter 6.

Each of the plurality of interpolation calculators 11-1 to 11-N, 21-1 to 21-M interpolates the pixel value of each missing pixel in the input image Di, and supplies the interpolated pixel value (interpolated value) as an interpolation candidate value P(h) of the missing pixel to the outputter 5. It also treats a plurality of non-missing pixels in the vicinity (neighborhood) of the missing pixel, as test pixels, interpolates the pixel value of each of the test pixels, and supplies the interpolated pixel value (interpolated value) as a test interpolated value P(t) of the test pixel, to the decider 4.

The interpolation of the test pixel is referred to as test interpolation. The test interpolation is performed hypothetically assuming that the pixel value of the test pixel is unknown.

In the interpolation of each missing pixel, pixels in the neighborhood of the missing pixel are referenced.

In the interpolation of each test pixel (test interpolation), pixels in the neighborhood of the test pixel are referenced.

The relative positions of the neighboring pixels referenced in the test interpolation of each test pixel, with respect to the test pixel, are identical to the relative positions of the neighboring pixels referenced in the interpolation of each missing pixel, with respect to the missing pixel.

The interpolation calculation method used for the test interpolation is identical to the interpolation calculation method used for the interpolation of the missing pixel.

The test interpolation in which a plurality of non-missing pixels in the vicinity of each missing pixel are treated as test pixels may be referred to as test interpolation pertaining to the particular missing pixel.

The plurality of interpolation calculators 11-1 to 11-N, 21-1 to 21-M include a first group of interpolation calculators 11-1 to 11-N and a second group of interpolation calculators 21-1 to 21-M.

The first group of interpolation calculators 11-1 to 11-N consist of first to N-th mean preserving interpolation calculators 11-1 to 11-N. N is an integer not smaller than 2.

The first to N-th mean preserving interpolation calculators 11-1 to 11-N perform interpolation by mean preserving interpolation calculation.

The first to N-th mean preserving interpolation calculators 11-1 to 11-N differ from each other in the number of pixels referenced in the interpolation.

The operation of the mean preserving interpolation calculators 11-1 to 11-N is described below. First, the operation at the time of the interpolation of a missing pixel is explained.

Figure 4:
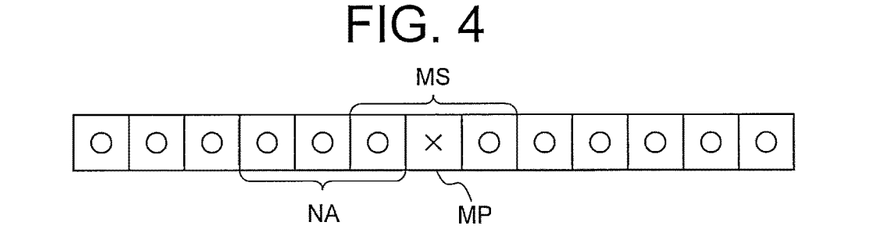
FIG. 4 is a diagram showing pixels referenced in the interpolation by a mean preserving interpolation calculator shown in FIG. 1.

FIG. 4 shows part of the input image Di, and indicates the positions of the pixels referenced in the interpolation by one of the mean preserving interpolation calculators 11-1 to 11-N, i.e., the n-th mean preserving interpolation calculator 11-$n$ ($n$ being any of 1 to N). The position of the missing pixel MP in the input image Di is assumed to be known in advance. The non-missing pixels are indicated by "○", and the missing pixel MP is indicated by "x".

Reference characters MS and NA respectively indicate pixel arrays each consisting of a plurality of consecutive pixels. The pixel array MS includes the missing pixel MP, and the pixel array NA does not include the missing pixel MP. The pixel array MS is referred to as a missing part, and the pixel array NA is referred to as a non-missing part. As will be apparent from the following description, the pixels in the missing part MS and the non-missing part NA are referenced in the interpolation. The number of pixels constituting the missing part MS and the number of pixels constituting the non-missing part NA are the same. This number is denoted by k. In the illustrated example, k is 3.

k is preset as a parameter in each mean preserving interpolation calculator.

Parameters k of mutually different values are set in the plurality of mean preserving interpolation calculators 11-1 to 11-N, with the result that the mean preserving interpolation calculators 11-1 to 11-N differ from each other in the number of pixels referenced in the interpolation.

The mean preserving interpolation calculator 11-$n$ interpolates the pixel value of the missing pixel MP such that the mean value of the pixel values of the pixels in the missing part MS is equal to the mean value of the pixel values of the pixels in the non-missing part NA. That is, the interpolated value P is so determined that the mean value of the pixels in the missing part MS other than the missing pixel MP, and the interpolated value P of the missing pixel MP equals the mean value of the pixel values of the pixels in the non-missing part NA.

Figure 5:
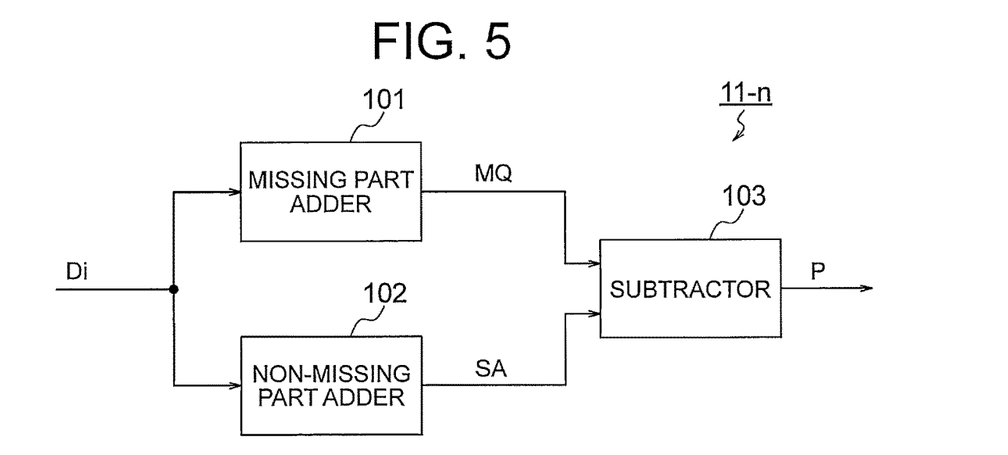
FIG. 5 is a functional block diagram showing an example of a configuration of the mean preserving interpolation calculator shown in FIG. 1.

FIG. 5 is a functional block diagram showing an example of a configuration of the mean preserving interpolation calculator 11-$n$.

The mean preserving interpolation calculator 11-$n$ comprises a missing part adder 101, a non-missing part adder 102, and a subtractor 103.

The image data Di read from the data storage 2 is inputted to the missing part adder 101 and the non-missing part adder 102.

The missing part adder 101 determines a sum of the pixel values of the pixels other than the missing pixel MP, among the k pixels included in the missing part MS, and outputs the sum as a missing part total MQ.

The non-missing part adder 102 determines a sum of the pixel values of k pixels included in the non-missing part NA, and outputs the sum as a non-missing part total SA.

The subtractor 103 subtracts the missing part total MQ from the non-missing part total SA.

The difference value obtained as a result of the subtraction is used as the interpolated value P of the missing pixel MP.

The above-described process can be expressed by the following mathematical equation.

$$P = SA - MQ \tag{1}$$

The interpolated value P outputted from the subtractor 103 as a result of the above-described process is one so determined that the mean value of the pixel values of the pixels in the missing part MS is equal to the mean value of the pixel values of the pixels in the non-missing part NA.

The reason therefor is explained below.

The mean value MSav of the pixel values of the pixels in the missing part MS is given by:

$$MSav = (MQ + P)/k \tag{2}$$

The mean value NAav of the pixel values of the pixels in the non-missing part NA is given by:

$$NAav = SA/k \tag{3}$$

In order for MSav and NAav to be equal to each other, it is sufficient if the interpolated value P is so determined as to satisfy the following equation.

$$(MQ + P)/k = SA/k \tag{4}$$

By transforming the equation (4), the equation (1) is obtained.

Accordingly, if the interpolated value P is determined by the process represented by the equation (1), the mean value of the pixel values of the pixels in the missing part MS is equal to the mean value of the pixel values of the pixels in the non-missing part NA.

The interpolated value P calculated for each missing pixel in each mean preserving interpolation calculator 11-$n$ is supplied as an interpolation candidate value P(h) to the outputter 5.

The mean preserving interpolation calculators 11-1 to 11-N are capable of performing interpolation with a high accuracy in image edge parts and image parts where the pixel value varies periodically. With respect to the image parts in which the pixel value varies periodically, the period of variation (and hence the spatial frequency) of the pixel value for which accurate interpolation is possible varies depending on the number of the referenced pixels. The numbers of pixels referenced in the interpolation by the mean preserving interpolation calculators 11-1 to 11-N are therefore determined according to the range of the period of the variation (the range of the spatial frequency) of the pixel value for which accurate interpolation is desired.

The mean preserving interpolation calculator 11-$n$ shown in FIG. 5 is also used for the test interpolation.

The operation performed by the mean preserving interpolation calculator 11-$n$ at the time of the test interpolation is identical to the above-described operation performed at the time of the interpolation of the missing pixel MP (calculation of the interpolation candidate value P(h)). However, at the time of the test interpolation, the interpolation calculation is performed by treating each test pixel as a missing pixel, and the calculated pixel value P is outputted as the test interpolated value P(t).

The second group of interpolation calculators 21-1 to 21-M consist of first to M-th interpolation calculators 21-1 to 21-M. M is an integer not smaller than 2.

The first to M-th interpolation calculators 21-1 to 21-M perform interpolation in an interpolation calculation method different from the above-described mean preserving interpolation calculation.

The first to M-th interpolation calculators 21-1 to 21-M differ from each other in at least one of the interpolation calculation method used for the interpolation and the number of pixels referenced in the interpolation.

Examples of the interpolation calculation performed by the first to M-th interpolation calculators 21-1 to 21-M include linear interpolation calculation, bi-cubic interpolation calculation, and Lanczos interpolation calculation.

Like the first to N-th mean preserving interpolation calculators 11-1 to 11-N, the first to M-th interpolation calculators 21-1 to 21-M not only calculate interpolation candidate values P(h) of each missing pixel, and supply them to the outputter 5, but also calculate test interpolated values P(t) pertaining to each of the plurality of non-missing pixels in the vicinity of the missing pixel, and supply them to the decider 4.

The decider 4 receives not only the test interpolated values P(t) supplied from the interpolation calculators 11-1 to 11-N and 21-1 to 21-M, but also the pixel values (original pixel values) Di of the test pixels from the data storage 2.

The decider 4 performs evaluation based on the test interpolated values P(t) inputted from the interpolation calculators 11-1 to 11-N and 21-1 to 21-M, and the original pixel values Di inputted from the data storage 2, and calculates error index values indicating the results of the evaluation. The evaluation is performed for each of the interpolation calculators and for each missing pixel.

For example, the error index value pertaining to each interpolation calculator is determined by collecting the results of the test interpolation pertaining to each missing pixel. For example, the error index value pertaining to each interpolation calculator is determined by collecting absolute difference values between the test interpolated values P(t) calculated by the interpolation calculator, for the respective test pixels in the vicinity of the missing pixel, and the original pixel values of the test pixels, over all the test pixels in the vicinity of the missing pixel.

For example, the above-mentioned error index value may be a value obtained by dividing an accumulated value of the above-mentioned absolute difference values over all the test pixels, by the number of the test pixels, i.e., an average value (difference average value) of the above-mentioned absolute difference values.

If the number of the test pixels for which the test interpolated values P(t) are calculated is identical between the interpolation calculators, the above-mentioned error index value may be the accumulated value (difference accumulated value) of the above-mentioned absolute difference values over all the test pixels.

The above-mentioned error index value represents the suitability of each interpolation calculator, i.e., the accuracy of the interpolation calculation by each interpolation calculator, in the vicinity of each missing pixel, and it can be said that the smaller the error index value is the higher the accuracy (the smaller the degree of the error) is.

For each of the interpolation calculators 11-1 to 11-N and 21-1 to 21-M, the above-mentioned error index value is calculated for each missing pixel.

The decider 4 identifies the interpolation calculator which has yielded the smallest error index value, for each missing pixel, and outputs a signal (selection signal) HS indicating the identified interpolation calculator, to the outputter 5.

As has been described, the interpolated values P calculated by the interpolation calculators 11-1 to 11-N and 21-1 to 21-M for each missing pixel are inputted as the interpolation candidate values P(h), to the outputter 5.

The outputter 5 selects the output of the interpolation calculator indicated by the selection signal HS from the decider 4, among the outputs (interpolation candidate values) P(h) of the interpolation calculators 11-1 to 11-N and 21-1 to 21-M, and outputs the selected output as the interpolated value HV of the missing pixel.

The interpolated data inserter 6 receives the image data Di read from the data storage 2, and receives the interpolated value HV outputted from the outputter 5, inserts the interpolated value HV pertaining to the missing pixel outputted from the outputter 5, as the pixel value of the missing pixel in the input image Di, and outputs the image data Du filled with the pixel value of the missing pixel.

The image data Du has the interpolated value HV for the missing pixel, and the original pixel values for the non-missing pixels. That is, the pixel value Du represented by the image data Du is equal to the interpolated value with regard to each missing pixel, and to the original pixel value Di with regard to each non-missing pixel.

By forming the pixel interpolation device in the manner described above, it is possible to select, as the interpolation calculation for each missing pixel, the interpolation calculation whose test interpolated values are the closest to the original pixel values Di, with regard to the test pixels in the vicinity of the missing pixel. It is therefore possible to perform the pixel interpolation in which the result of interpolation calculation which is most suitable is used according to the feature of the image (image part in the vicinity of the missing pixel).

As was explained above, the mean preserving interpolation calculators 11-1 to 11-N can perform interpolation with a high accuracy in the image edge parts and in the image parts where the pixel value varies periodically. With regard to the image parts where the pixel value varies periodically, one of the plurality of mean preserving interpolation calculators which is most suitable is selected according to the period of the pixel value variation. In the parts other than the image edge parts and the image parts in which the pixel value varies periodically, interpolation by one of the interpolation calculators other than the mean preserving interpolation calculators may achieve interpolation with a higher accuracy. In such a case, the interpolation calculator which is other than the mean preserving interpolation calculators and which achieves the interpolation with a higher accuracy is selected. Therefore, in the pixel interpolation device of the present embodiment, the most suitable interpolation calculator is selected according to the feature of the image.

Also, by including the mean preserving interpolation as the interpolation calculation, it is possible to reproduce, with a high accuracy, the image parts periodically varying at a high frequency and edge parts.

Second Embodiment

The overall configuration of the pixel interpolation device 1 according to a second embodiment is as shown in FIG. 1.

The second embodiment differs from the first embodiment in the content of the process performed in each of the mean preserving interpolation calculators 11-1 to 11-N.

In the first embodiment, the number of pixels in the missing part and the number of pixels in the non-missing part which are referenced in the interpolation by each mean preserving interpolation calculator 11-$n$ are equal to each other. In the second embodiment, the number of pixels in the non-missing part is larger than the number of pixels in the missing part.

Figure 6:
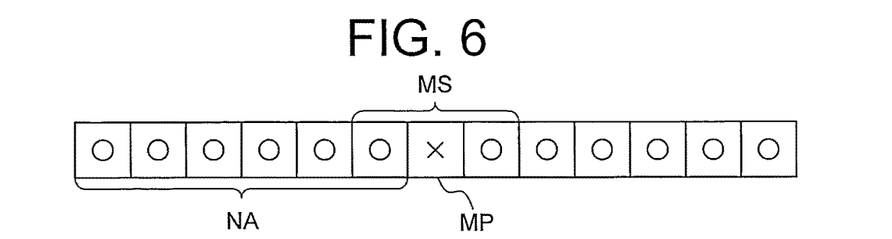
FIG. 6 is a diagram showing pixels referenced in the interpolation by a mean preserving interpolation calculator used in a second embodiment.

FIG. 6 shows part of the input image Di, and indicates the positions of the pixels referenced in the interpolation by the mean preserving interpolation calculator 11-$n$ in the present embodiment.

As in FIG. 4, the position of the missing pixel MP in the input image Di is assumed to be known in advance. The non-missing pixels are indicated by "○", and the missing pixel MP is indicated by "x".

The missing part MS and the non-missing part NA are, as in FIG. 4, pixel arrays each consisting of a plurality of pixels, the missing part MS includes the missing pixel MP, and the non-missing part NA does not include the missing pixel MP.

Unlike FIG. 4, the number of pixels, kb, constituting the non-missing part NA is larger than the number of pixels, ka, constituting the missing part MS.

In the illustrated example, ka=3, kb=6.

ka and kb are preset as parameters in each mean preserving interpolation calculator.

The plurality of mean preserving interpolation calculators 11-1 to 11-N differ from each other in the value of at least one of the parameters ka and kb.

The number of pixels referenced in the interpolation is dependent on the values of the parameters ka, kb. Therefore, the plurality of mean preserving interpolation calculators 11-1 to 11-N differ from each other in the number of pixels referenced in the interpolation.

As in the first embodiment, the mean preserving interpolation calculator 11-$n$ interpolates the pixel value P of the missing pixel MP such that the mean value of the pixel values of the pixels in the missing part MS is equal to the mean value of the pixel values of the pixels in the non-missing part NA.

Figure 7:
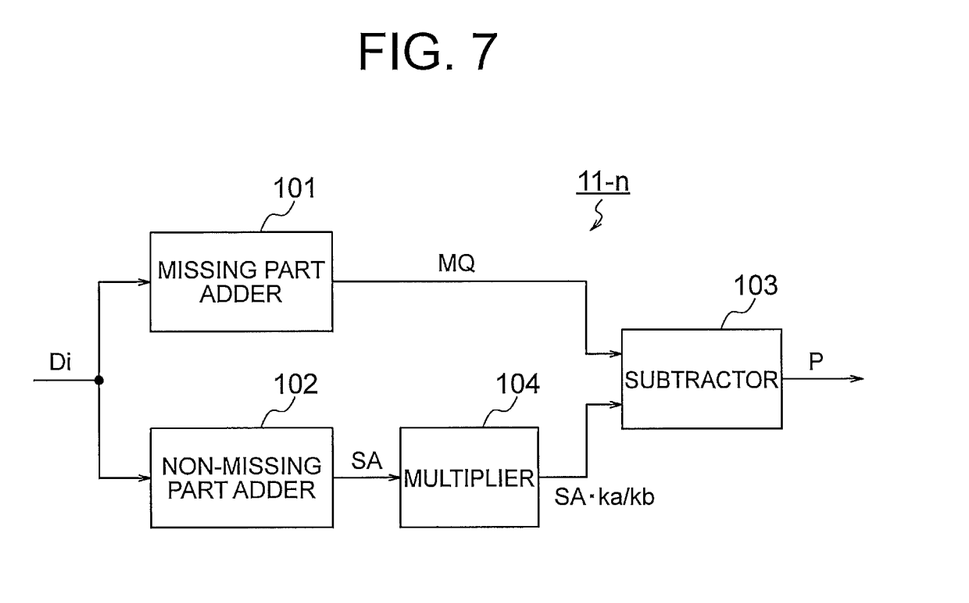
FIG. 7 is a functional block diagram showing an example of a configuration of the mean preserving interpolation calculator used in the second embodiment.

FIG. 7 is a functional block diagram showing an example of a configuration of the mean preserving interpolation calculator 11-$n$ used in the second embodiment.

The mean preserving interpolation calculator 11-$n$ in FIG. 7 is generally identical to the mean preserving interpolation calculator 11-$n$ in FIG. 5. A difference is that a multiplier 104 is added.

The multiplier 104 multiplies the output SA of the non-missing part adder 102 by a parameter ratio ka/kb.

The subtractor 103 subtracts the output MQ of the missing-part adder 101 from the output (SA·ka/kb) of the multiplier 104.

The difference value obtained as a result of the subtraction is used as the interpolated value P of the missing pixel MP.

The above-described process can be expressed by the following mathematical equation.

$$P = SA \cdot ka/kb - MQ \qquad (5)$$

The interpolated value P outputted from the subtractor 103 as a result of the above-described process is one so determined that the mean value of the pixel values of the pixels in the missing part MS is equal to the mean value of the pixel values of the pixels in the non-missing part NA.

The interpolated value P calculated for the missing pixel MP is supplied as an interpolation candidate value P(h) to the outputter 5.

The test interpolation is performed in the same manner as the interpolation of the missing pixel, and the interpolated values P are supplied as test interpolated values P(t) to the decider 4.

Incidentally, in FIG. 6, the non-missing part consists of a plurality of consecutive pixels. The non-missing part may alternatively consist of non-consecutive pixels. For example, the non-missing part may comprise a plurality of mutually consecutive pixels positioned on one side (left side in the drawing) of the missing pixel MP, and a plurality of mutually consecutive pixels positioned on the other side (right side in the drawing) of the missing pixel MP.

By forming the mean preserving interpolation calculators 11-1 to 11-N in the manner described above, the number of pixels in the non-missing part becomes large, and the interpolated value of the missing pixel becomes more natural, compared with the method of the first embodiment.

Third Embodiment

Figure 8:
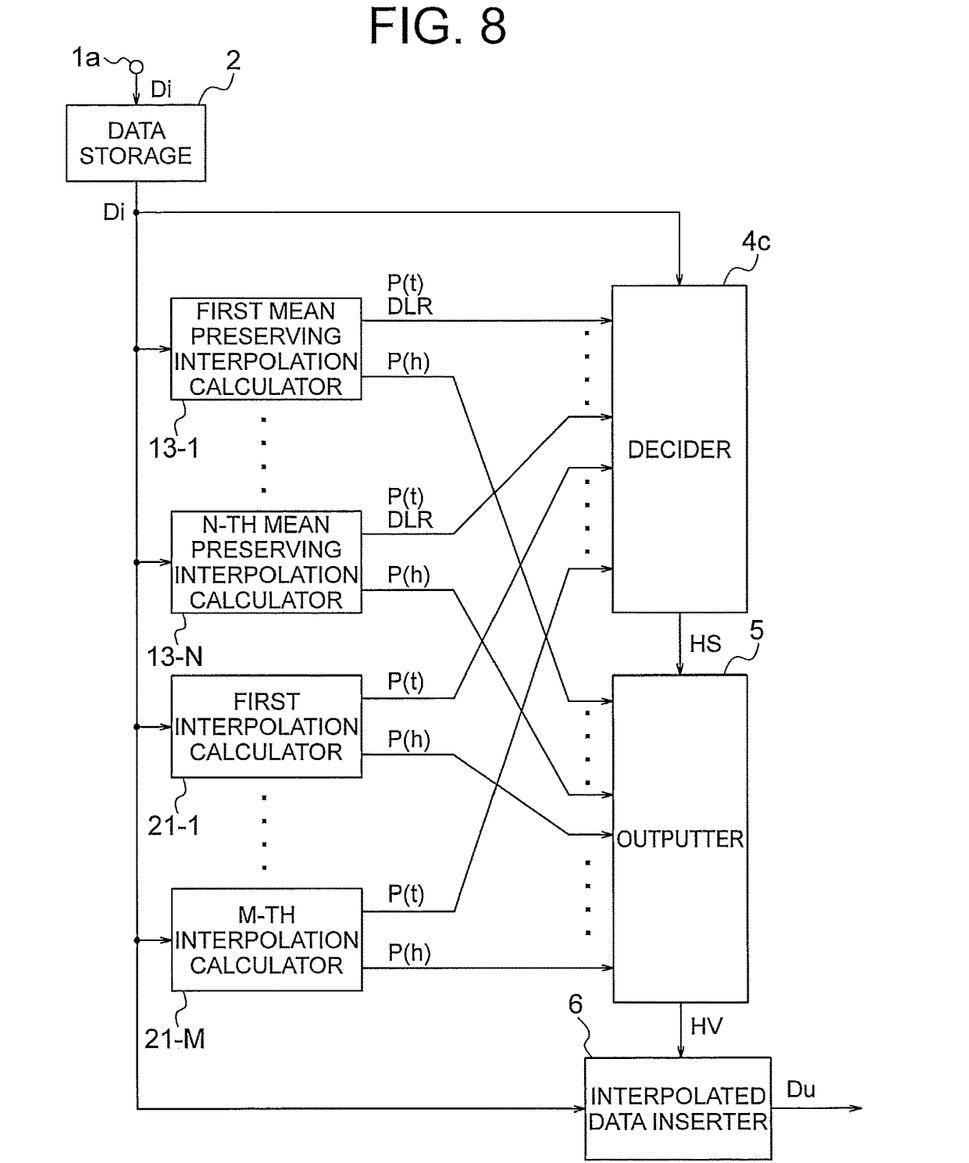
FIG. 8 is a functional block diagram schematically showing a configuration of a pixel interpolation device of a third embodiment of the present invention.

A pixel interpolation device 1c according to a third embodiment has a configuration generally as shown in FIG. 8.

The pixel interpolation device 1c shown in FIG. 8 is generally identical to the pixel interpolation device 1 in FIG. 1, but differs on the following points.

That is, in place of the mean preserving interpolation calculators 11-1 to 11-N in FIG. 1, mean preserving interpolation calculators 13-1 to 13-N are provided.

The first to N-th mean preserving interpolation calculators 13-1 to 13-N all perform the mean preserving interpolation calculation, but differ from each other in the number of pixels referenced in the interpolation.

Each of the first to N-th mean preserving interpolation calculators 13-1 to 13-N, i.e., the n-th mean preserving interpolation calculator 13-$n$, is similar to the n-th mean preserving interpolation calculator 11-$n$ in the first embodiment, but differs in the arrangement of the pixels referenced in the interpolation, and has a function of determining a difference between a sum of the pixel values of a plurality of non-missing pixels positioned on one side of the missing pixel, and a sum of the pixel values of a plurality of non-missing pixels positioned on the other side of the missing pixel.

The operation of the mean preserving interpolation calculators 13-1 to 13-N is described below, in comparison with the mean preserving interpolation calculators 11-1 to 11-N in the first and second embodiments. First, the interpolation of a missing pixel is explained.

Figure 9:
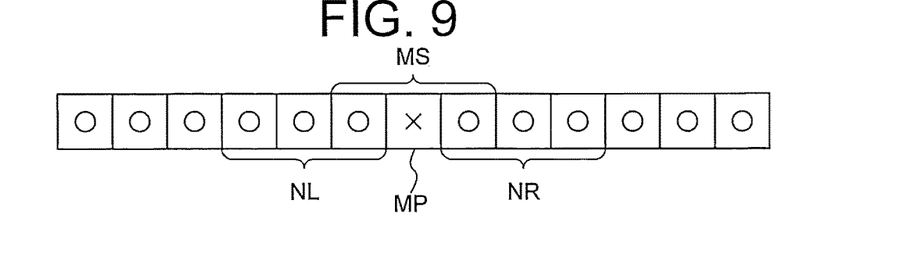
FIG. 9 is a diagram showing pixels referenced in the interpolation by a mean preserving interpolation calculator shown in FIG. 8.

FIG. 9 shows part of the input image Di, and indicates the positions of the pixels referenced in the interpolation by the mean preserving interpolation calculator 13-$n$ in the present embodiment.

As in FIG. 4 and FIG. 6, the position of the missing pixel MP in the input image Di is assumed to be known in advance. The non-missing pixels are indicated by "○", and the missing pixel MP is indicated by "x".

As in FIG. 6, the missing part MS is a pixel array consisting of ka pixels, and the missing part MS includes the missing pixel MP.

Unlike FIG. 4 and FIG. 6, the non-missing part NA comprises a first part NL positioned on one side of the missing pixel MP, and a second part NR positioned on the other side of the missing pixel MP.

In the following description, the first part NL is referred to as a left-side part and the second part NR is referred to as a right-side part.

Each of the left-side part NL and the right-side part NR is a pixel array which consists of a plurality of pixels and does not include the missing pixel MP.

The left-side part NL and the right-side part NR consist of the same number of pixels, and are formed to be symmetrical with respect to the missing pixel MP.

For example, the number of pixels, kc, constituting each of the left-side part NL and the right-side part NR is equal to the number of pixels, ka, constituting the missing part MS.

In the illustrated example, ka=kc=3.

Accordingly, the number of pixels, kb, constituting the non-missing part NA comprising the left-side part NL and the right-side part NR is twice kc.

ka and kc are preset as parameters, in each mean preserving interpolation calculator.

The first to N-th mean preserving interpolation calculators 13-1 to 13-N differ from each other in the value of at least one of the parameters ka and kc. Accordingly, they differ in the number of pixels referenced in the interpolation.

Incidentally, in place of ka and kc, ka and kb may be preset as parameters in each mean preserving interpolation calculator.

Like the n-th mean preserving interpolation calculator 11-$n$ in the first and second embodiments, the n-th mean preserving interpolation calculator 13-$n$ interpolates the pixel value of the missing pixel MP such that the mean value of the pixel values of the pixels in the missing part MS is equal to the mean value of the pixel values of the pixels in the non-missing part NA. However, the non-missing part NA includes the left-side part NL and the right-side part NR.

Figure 10:
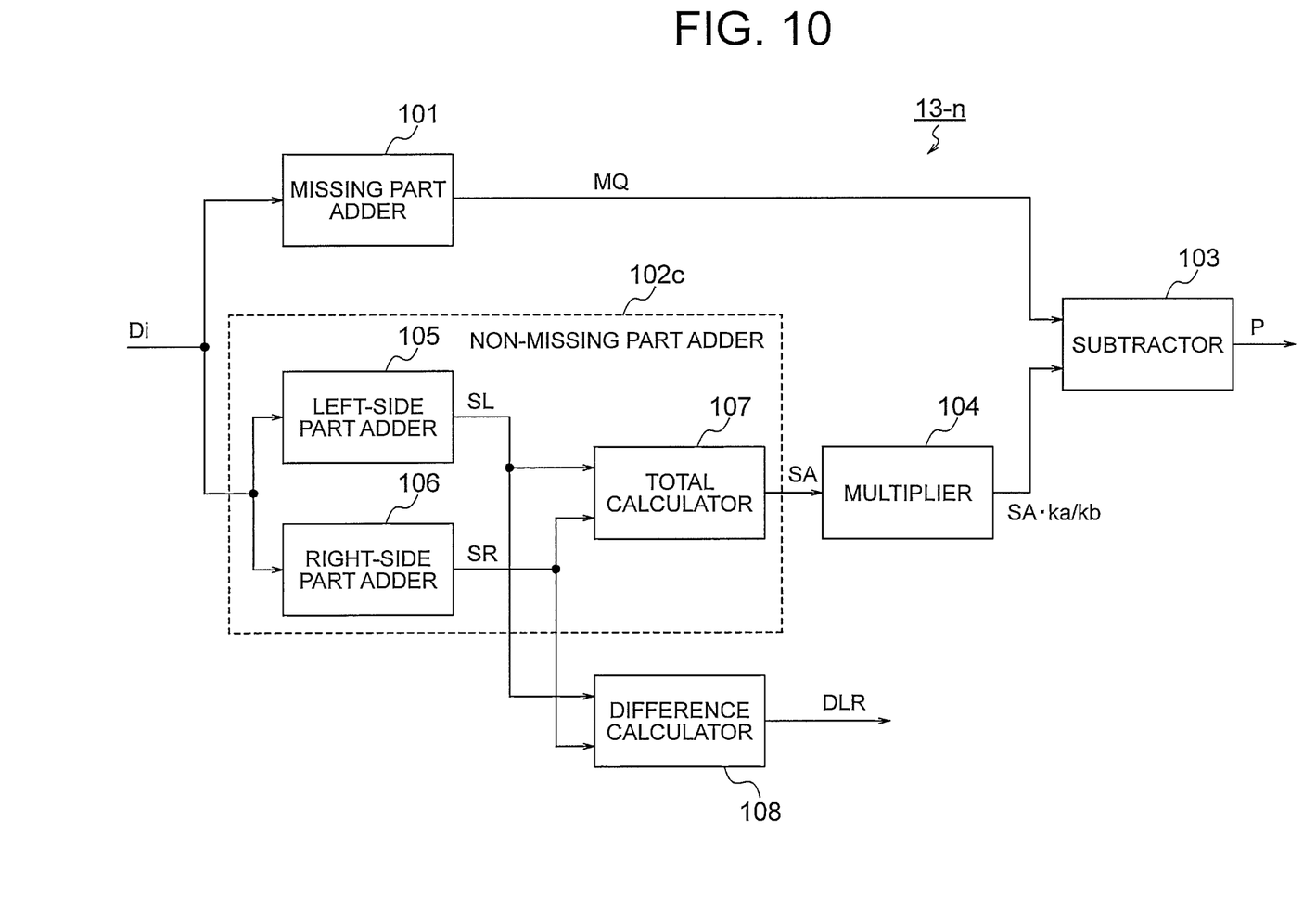
FIG. 10 is a functional block diagram showing an example of a configuration of the mean preserving interpolation calculator shown in FIG. 8.

FIG. 10 is a functional block diagram showing an example of a configuration of the mean preserving interpolation calculator 13-$n$.

The mean preserving interpolation calculator 13-$n$ in FIG. 10 includes a missing part adder 101, a left-side part adder 105, a right-side part adder 106, a total calculator 107, a multiplier 104, a subtractor 103, and a difference calculator 108.

The missing part adder 101 determines a sum of the pixel values of the pixels other than the missing pixel MP, among the ka pixels included in the missing part MS, and outputs the sum as a missing part total MQ.

The left-side part adder 105 determines a sum of the pixel values of kc pixels included in the left-side part NL, and outputs the sum as a left-side partial sum SL.

The right-side part adder 106 determines a sum of the pixel values of the kc pixels included in the right-side part NR, and outputs the sum as a right-side partial sum SR.

The total calculator 107 adds the left-side partial sum SL and the right-side partial sum SR together, and outputs the result of the addition as a non-missing part total SA.

The left-side part adder 105, the right-side part adder 106, and the total calculator 107 in combination form a non-missing part adder 102$c$.

The multiplier 104 multiplies the output SA of the non-missing part adder 102$c$ by the parameter ratio ka/kb.

The subtractor 103 subtracts the output MQ of the missing part adder 101 from the output (SA·ka/kb) of the multiplier 104.

The difference value obtained as a result of the subtraction is used as the interpolated value of the missing pixel MP.

The above-described process can be expressed by the following mathematical equation.

$$P=(SL+SR) \cdot ka/kb - MQ \quad (6)$$

As a result of the above-described process, the interpolated value P of the missing pixel MP outputted from the subtractor 103 is one so determined that the mean value of the pixel values of the pixels in the missing part MS is equal to the mean value of the pixel values of the pixels in the non-missing part NA, based on the partial sums SL, SR and the missing part total MQ.

The interpolated value P calculated for the missing pixel MP is supplied as an interpolation candidate value P(h) to the outputter 5.

The difference calculator 108 calculates an absolute difference value between the output (left-side partial sum) SL of the left-side part adder 105, and the output (right-side partial sum) SR of the right-side part adder 106. The calculated absolute difference value is sent, as a left-right difference value DLR, to the decider 4$c$.

The left-right difference value DLR calculated for each missing pixel, represents a difference between the sum of the pixel values of the pixels in the left-side part positioned on the left side (the first part positioned on one side) of the missing pixel, and the sum of the pixel values of the pixels in the right-side part positioned on the right side (the second part positioned on the other side) of the missing pixel.

The calculation of the test interpolated values is performed in the same way as above. That is, like the mean preserving interpolation calculator 11-$n$, each mean preserving interpolation calculator 13-$n$ treats a plurality of non-missing pixels in the vicinity of the missing pixel as test pixels, performs the interpolation calculation for each of the test pixels to calculate the interpolated value P, and supplies the calculated interpolated value P as a test interpolated value P(t) to the decider 4$c$.

However, the left-right difference value DLR is not calculated for the test pixels.

The operation of the interpolation calculators 21-1 to 21-M is the same as in the first embodiment.

The decider 4$c$ calculates the error index values based on the test interpolated values P(t) supplied from the mean preserving interpolation calculators 13-1 to 13-N and the interpolation calculators 21-1 to 21-M in the same way as in the first and second embodiments.

The decider 4$c$ in the third embodiment differs from the decider 4 in the first embodiment and the second embodiment in the operation in the event that the interpolation calculator yielding the smallest error index value is one of the mean preserving interpolation calculators 13-1 to 13-N.

In the above-mentioned situation, the decider 4$c$ determines whether the left-right difference value DLR corresponding to the mean preserving interpolation calculator having been determined to yield the smallest error index value is larger than a predetermined threshold value DRLth, and, if the left-right difference value DLR is larger than the threshold value DLRth, the decider 4$c$ selects a pre-designated interpolation calculator among the interpolation calculators 21-1 to 21-M, and communicates the result of the selection to the outputter 5.

The pre-designated interpolation calculator is, for example, one which performs interpolation calculation using pixels proximate, e.g., adjacent to, the missing pixel. As the interpolation calculation, for example, linear interpolation calculation or bi-cubic interpolation calculation is used. When the linear interpolation calculation is performed, a mean value of a pair of non-missing pixels adjacent to the missing pixel is determined. When the bi-cubic interpolation calculation is performed, a pair of non-missing pixels adjacent to the missing pixel, and pixels adjacent to the above-mentioned pair of non-missing pixels (pixels adjacent to either of the pair of non-missing pixels, and positioned on the opposite side of the missing pixel) are used as reference pixels.

When there is a large difference in the pixel value between the left side and the right side of the missing pixel, the mean preserving interpolation may produce an unnatural pixel value. According to the present embodiment, an interpolation calculation method suitable for such a situation is used to obtain a more natural pixel value.

In the above-described embodiment, the left-right difference value is determined in each of a plurality of mean preserving interpolation calculators 13-1 to 13-N, and decision is made as to whether the left-right difference value determined by the mean preserving interpolation calculator selected based on the error index values, among the plurality of mean preserving interpolation calculators 13-1 to 13-N, is larger than the threshold value.

As an alternative, the left-right difference value may be determined in one of the plurality of mean preserving interpolation calculators 13-1 to 13-N, and decision may be made as to whether the determined left-right difference value is larger than a threshold value.

Also, the left-right difference value may be determined in one of the second group of interpolation calculators 21-1 to 21-M, and decision may be made as to whether the determined left-right difference value is larger than a threshold value.

Furthermore, the left-right difference value may be determined in two or more interpolation calculators among the plurality of interpolation calculators, a difference index value may be determined based on the two or more left-right difference values having been determined, and decision may be made as to whether the determined difference index value is larger than a threshold value.

What is essential is that the left-right difference value(s) is determined in one or more interpolation calculators among the plurality of interpolation calculators (13-1 to 13-N, 21-1 to 21-M), and decision is made as to whether the determined left-right difference value, or a difference index value calculated from the left-right difference value(s) is larger than a threshold value.

In the third embodiment, expressions "left" and "right" are used in connection with the positions of the pixels, and the positions of the non-missing parts. This, however, is for the sake of convenience, and what are meant are one side and the other side of the missing pixel.

That is, it is sufficient if the decider selects a pre-designated interpolation calculator among the second group of interpolation calculators when an absolute difference value between the sum of the pixel values in the first part NL and the sum of the pixel values in the second part NR, or a difference index value determined based on the absolute difference value(s) is larger than a predetermined threshold value.

In the first to third embodiments, the image data outputted from the data storage 2 may be data representing the luminance of the image, or data representing color components of the image. In other words, the pixel values processed by the pixel interpolation device may be luminance values or color component values.

When the image is a color image, the pixel interpolation device described in the first to third embodiments may be provided for each color component value.

In the following, an image processing device is described as a fourth embodiment in which three or more pixel interpolation devices are provided respectively for three or more color component values, and clipping processes are performed on the color-difference component values.

Fourth Embodiment

Figure 11:
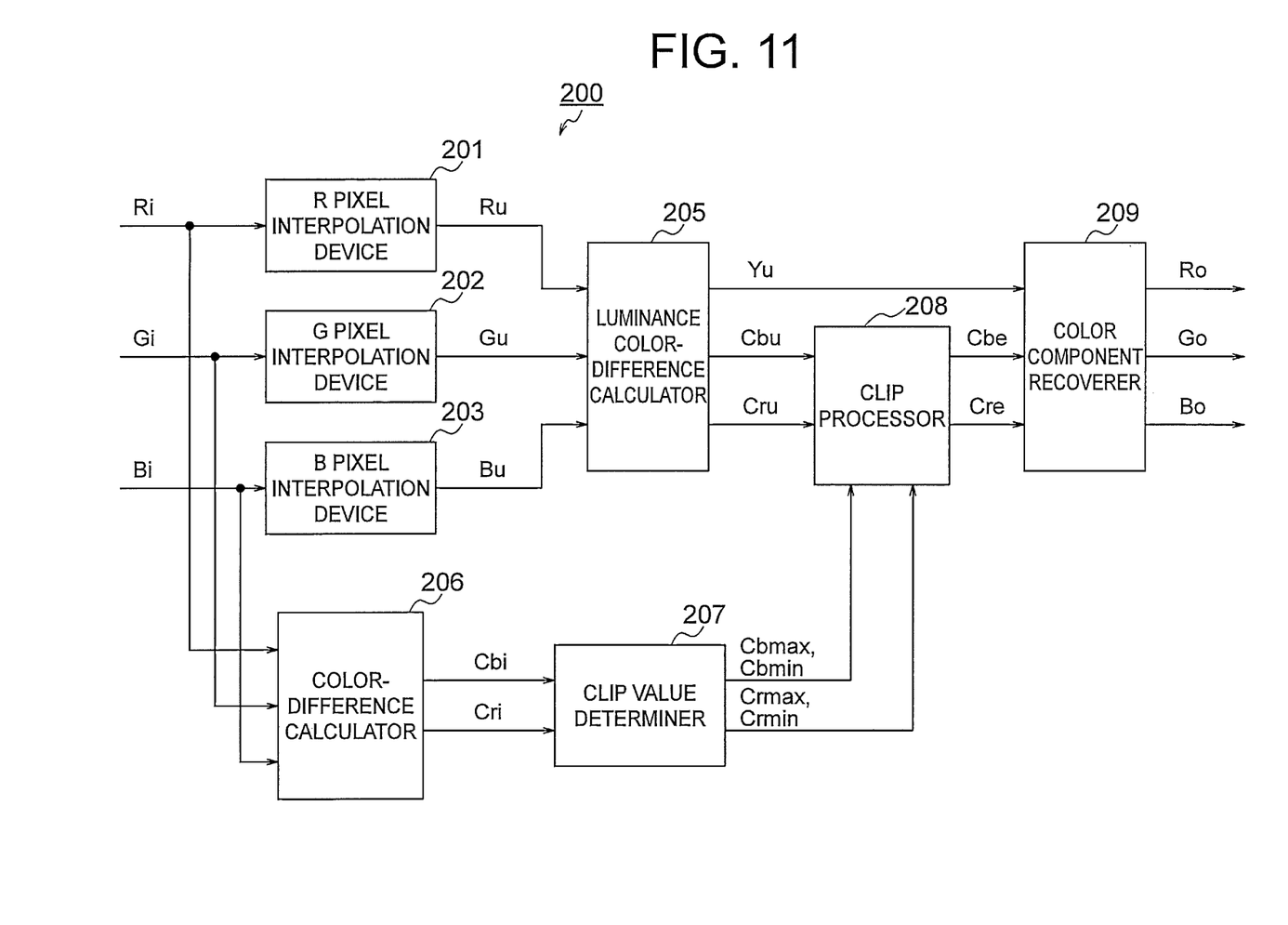
FIG. 11 is a functional block diagram schematically showing a configuration of an image processing device of a fourth embodiment of the present invention.

FIG. 11 is a functional block diagram schematically showing a configuration of an image processing device of the fourth embodiment of the present invention.

The image processing device shown in FIG. 11 includes an R pixel interpolation device 201, a G pixel interpolation device 202, a B pixel interpolation device 203, a luminance color-difference calculator 205, a color-difference calculator 206, a clip value determiner 207, a clip processor 208, and a color component recoverer 209.

Each of the R pixel interpolation device 201, the G pixel interpolation device 202 and the B pixel interpolation device 203 has a configuration similar to the pixel interpolation device in the first, second or third embodiment. Whereas the pixel interpolation device in the first, second or third embodiment receives the image data Di and outputs the image data Du, the R pixel interpolation device 201, the G pixel interpolation device 202, and the B pixel interpolation device 203 in the present embodiment respectively receive R image data Ri, G image data Gi, and B image data Bi, and respectively output R image data Ru, G image data Gu, and B image data Bu.

The R image data Ri, the G image data Gi, and the B image data Bi are obtained, for example, by reading an original by means of an imaging device including photo-electric conversion elements having sensitivity to R, G and B light (wavelength components), respectively. The photo-electric conversion elements having sensitivity to the R, G and B light are for example photo-electric conversion elements provided with color filters transmitting R, G and B light.

The R pixel interpolation device 201 interpolates pixel values (R component values) of the missing pixels in the image represented by the inputted R image data Ri. That is, it determines the interpolated values of the missing pixels based on the original pixel values (R component values) Ri represented by the R image data Ri, and outputs the image data Ru filled with the interpolated values as the R component values of the missing pixels.

The R component value Ru represented by the image data Ru is identical to the interpolated value with regard to each missing pixel and identical to the original pixel value (inputted R component value) Ri with regard to each non-missing pixel.

The G pixel interpolation device 202 interpolates pixel values (G component values) of the missing pixels in the image represented by the inputted G image data Gi. That is, it determines the interpolated values of the missing pixels based on the original pixel values (G component values) Gi represented by the G image data Gi, and outputs the image data Gu filled with the interpolated values as the G component values of the missing pixels.

The G component value Gu represented by the image data Gu is identical to the interpolated value with regard to each missing pixel, and identical to the original pixel value (inputted G component value) Gi with regard to each non-missing pixel.

The B pixel interpolation device 203 interpolates pixel values (B component values) of the missing pixels in the image represented by the inputted B image data Bi. That is, it determines the interpolated values of the missing pixels based on the original pixel values (B component values) Bi represented by the B image data Bi, and outputs the image data Bu filled with the interpolated values as the B component values of the missing pixels.

The B component value Bu represented by the image data Bu is identical to the interpolated value with regard to each missing pixel, and identical to the original pixel value (inputted B component value) Bi with regard to each non-missing pixel.

The pixel interpolation performed in each of the R pixel interpolation device 201, the G pixel interpolation device 202 and the B pixel interpolation device 203 may be identical to the pixel interpolation in the pixel interpolation device of any of the first, second and third embodiments. However, the number of the interpolation calculators included in the pixel interpolation device, the interpolation calculation method used in the interpolation in each interpolation calculator, and the number of pixels referenced in the interpolation may be different between the color components. This makes it possible to perform interpolation, for each color component, more suitable to the feature of the image of each color component.

The luminance color-difference calculator 205 converts the R component value Ru, the G component value Gu, and the B component value Bu pertaining to the same pixel in the image data Ru, Gu and Bu, into a luminance value Yu and color-difference component values Cbu, Cru, and outputs the luminance value Yu and the color-difference component values Cbu, Cru having been obtained by the conversion.

For the conversion, known conversion formulae are used. For example, when the color component values are represented by 8 bits, the following formulae are used.

$$Yu=0.257·Ru+0.504·Gu+0.098·Bu+16$$

$$Cbu=-0.148·Ru-0.291·Gu+0.439·Bu+128$$

$$Cru=0.439·Ru-0.368·Gu-0.071·Bu+128$$

The color-difference calculator 206 converts the R component value Ri, the G component value Gi and the B component value Bi pertaining to the same pixel in the image data Ri, Gi and Bi, into color-difference component values Cbi, Cri, and outputs the color-difference component values Cbi, Cri having been obtained by the conversion. For the conversion to the color-difference component values Cbi, Cri, known formulae for conversion from RGB to YCbCr may be used. However, since Y (luminance value) is not used, it need not be calculated. When the color component values are represented by 8 bits, the following formulae are used.

$$Cbi=-0.148·Ri-0.291·Gi+0.439·Bi+128$$

$$Cri=0.439·Ri-0.368·Gi-0.071·Bi+128$$

The clip value determiner 207 designates pixels within a predetermined area of the input image, as pixels to be referenced for the calculation of clip values (clip value calculation reference pixels), and determines the clip values from the Cb component value and the Cr component value obtained by the conversion at the color-difference calculator 206 for the clip value calculation reference pixels.

For example, the clip value determiner 207 determines the clip values for each missing pixel. In that case, the predetermined area mentioned above is an area consisting of pixels in the neighborhood of the missing pixel.

The neighborhood of the missing pixel means, for example, an area in which the distance from the missing pixel is not more than a predetermined value.

As the clip values, an upper clip value and a lower clip value are determined for each of the Cb component and the Cr component.

For example, the maximum value among the color-difference component values Cbi of the clip value calculation reference pixels, or a value close to the maximum value is determined as a Cb component upper clip value Cbmax, the minimum value among the color-difference component values Cbi of the clip value calculation reference pixels, or a value close to the minimum value is determined as a Cb component lower clip value Cbmin, the maximum value among the color-difference component values Cri of the clip value calculation reference pixels, or a value close to the maximum value is determined as a Cr component upper clip value Crmax, and the minimum value among the color-difference component values Cri of the clip value calculation reference pixels, or a value close to the minimum value is determined as a Cr component lower clip value Crmin.

A "value close to the maximum value" is, for example, a value at a predetermined place when the color-difference component values are arranged in the order of magnitude. The predetermined place may be determined according to the number of clip value calculation reference pixels. For example, it may be determined at an ordinal number matching the number corresponding to a predetermined proportion in the clip value calculation reference pixels.

Similarly, a "value close to the minimum value" is, for example, a value at a predetermined place when the color-difference component values are arranged in the order of smallness. The predetermined place may be determined according to the number of clip value calculation reference pixels.

The clip processor 208 performs clipping process on the color-difference component values Cbu, Cru, using the upper clip value and the lower clip value determined by the clip value determiner 207, respectively as an upper limit and a lower limit, and outputs clipped color-difference component values Cbe, Cre.

The color component recoverer 209 performs conversion from the color-difference component values Cbe, Cre outputted from the clip processor 208 and the luminance value Yu outputted from the luminance color-difference calculator 205, to the color component values, and outputs the R, G, B component values Ro, Go, Bo obtained by the conversion.

For the conversion, known formulae may be used. For example, when Yu, Cbe, Cre are represented by 8 bits, the following formulae may be used.

$$Ro=1.164·(Yu-16)+1.596·(Cre-128)$$

$$Go=1.164·(Yu-16)-0.391·(Cbe-128)-0.813·(Cre-128)$$

$$Bo=1.164·(Yu-16)+2.018·(Cbe-128)$$

In the above example, the clipping process is performed on the Cb component value and the Cr component value which are generated by conversion from RGB to CbCr. However, the clipping process may be performed on a Pb component value and a Pr component value which are generated by conversion to YPbPr. Also, the clipping process may be performed on a U component value and a V component value generated by conversion to YUV.

What is essential is that the clipping process is performed on color-difference components generated by conversion into a luminance component and color-difference components.

With such an arrangement, the luminance is not altered, while generation of false colors can be restrained.

In the above example, the clip values include the upper clip value and the lower clip value. Just one of the upper clip value and the lower clip value may be used.

By forming the pixel interpolation device in the manner described above, interpolation calculation is performed for each of the R, G, and B color components independently, and it is possible to restrain generation of false colors in the missing pixel part in the color image. Also, it is possible to prevent the interpolated pixels in the color image from becoming unnatural.

The invention has been described as a pixel interpolation device and an image processing device. A pixel interpolation method performed in the above-described pixel interpolation device, and an image processing method performed in the above-described image processing device also form part of the present invention.

Also, a program for causing a computer to execute the processes in the above-described pixel interpolation device or the pixel interpolation method, and a program for causing a computer to execute the processes in the above-described image processing device or the image processing method are part of the present invention.

Furthermore, a computer-readable recording medium in which the above-mentioned program(s) is recorded is also part of the present invention.

REFERENCE CHARACTERS 1, 1c: pixel interpolation device; 2: data storage; 4, 4c: decider; 5: outputter; 6: interpolated data inserter; 11-1 to 11-N, 13-1 to 13-N: mean preserving interpolation calculator; 21-1 to 21-M: interpolation calculator; 101: missing part adder; 102: non-missing part adder; 103: subtractor; 104: multiplier; 105: left-side part adder; 106: right-side part adder; 107: total calculator; 108: difference calculator; 201: R pixel interpolation device; 202: G pixel interpolation device; 203: B pixel interpolation device; 205: luminance color-difference calculator; 206: color-difference calculator; 207: clip value determiner; 208: clip processor; 209: color component recoverer.

The invention claimed is:

1. A pixel interpolation device comprising processing circuitry configured as:
a plurality of interpolation calculators each interpolating a pixel value of a missing pixel in an input image, based on pixel values of pixels constituting said input image;
a decider; and
an outputter, wherein
each of said plurality of interpolation calculators interpolates the pixel value of said missing pixel, and outputs the interpolated pixel value as an interpolation candidate value, treats a plurality of non-missing pixels in a vicinity of said missing pixel as test pixels, interpolates a pixel value of each of said test pixels, and outputs the interpolated pixel value as a test interpolated value of the test pixel,
the interpolation of said test pixels is performed in a same interpolation method as the interpolation of said missing pixel,
said plurality of interpolation calculators include a first group of interpolation calculators, and a second group of interpolation calculators,
said first group of interpolation calculators perform the interpolation by mean preserving interpolation calculation,
said first group of interpolation calculators differ from each other in a number of pixels referenced,
said second group of interpolation calculators perform the interpolation by interpolation calculation different from said mean preserving interpolation calculation,
said second group of interpolation calculators differ from each other in at least one of an interpolation calculation method and a number of pixels referenced,
said decider calculates error index values pertaining to respective interpolation calculators, based on absolute difference values between said test interpolated values pertaining to the respective test pixels in the vicinity of each missing pixel, and the pixel values of the test pixels, and selects one of the plurality of interpolation calculators based on the calculated error index values, and
said outputter selects, for each missing pixel, the interpolation candidate value outputted from the interpolation calculator selected by said decider, among the interpolation candidate values outputted from the plurality of interpolation calculators, and outputs the selected interpolation candidate value.

2. The pixel interpolation device as set forth in claim 1, wherein
said mean preserving interpolation calculation interpolates the pixel value of the missing pixel such that a mean value of pixel values of pixels in a missing part consisting of a plurality of pixels which include the missing pixel is equal to a mean value of pixel values of pixels in a non-missing part consisting of a plurality of pixels which do not include the missing pixel.

3. The pixel interpolation device as set forth in claim 2, wherein a number of pixels in said missing part and a number of pixels in said non-missing part are equal to each other.

4. The pixel interpolation device as set forth in claim 3, wherein, in the mean preserving interpolation calculation,
a sum of pixel values of the pixels other than the missing pixel, in said missing part is determined as a missing part total,
a sum of pixel values of the pixels in said non-missing part is determined as a non-missing part total, and
a difference value obtained by subtracting said missing part total from said non-missing part total is determined as the pixel value of said missing pixel.

5. The pixel interpolation device as set forth in claim 2, wherein a number of pixels in said non-missing part is larger than a number of pixels in said missing part.

6. The pixel interpolation device as set forth in claim 5, wherein, in the mean preserving interpolation calculation,
a sum of pixel values of the pixels other than the missing pixel, in said missing part is determined as a missing part total,
a sum of pixel values of the pixels in said non-missing part is determined as a non-missing part total, and
a difference value obtained by subtracting said missing part total from a product of a ratio of the number of pixels in said missing part to the number of pixels in said non-missing part and said non-missing part total is calculated as the pixel value of said missing pixel.

7. The pixel interpolation device as set forth in claim 2, wherein
said non-missing part referenced in the interpolation by at least one mean preserving interpolation calculator among said plurality of mean preserving interpolation calculators comprises a first part positioned on one side of said missing pixel and a second part positioned on the other side of said missing pixel, and
when an absolute difference value between a sum of pixel values of the pixels in said first part and a sum of pixel values of the pixels in said second part, or a difference index value determined based on said absolute difference value is larger than a predetermined threshold value, said decider selects a pre-designated interpolation calculator among said second group of interpolation calculators.

8. The pixel interpolation device as set forth in claim 7, wherein said pre-designated interpolation calculator is an interpolation calculator performing linear interpolation calculation or bi-cubic interpolation calculation.

9. The pixel interpolation device as set forth in claim 8, wherein said linear interpolation calculation is performed referencing non-missing pixels adjacent to the missing pixel.

10. The pixel interpolation device as set forth in claim 8, wherein said bi-cubic interpolation calculation is performed referencing first non-missing pixels adjacent to said missing pixel, and second non-missing pixels adjacent to said first non-missing pixels and positioned on the side opposite to said missing pixel.

11. An image processing device wherein
said input image is a color image represented by three or more color component values,
said image processing device comprising:
three or more pixel interpolation devices respectively provided for the color component values, each performing interpolation of the corresponding color component value,
a luminance color-difference calculator to convert color component values outputted from said three or more pixel interpolation devices into a luminance value and first and second color-difference component values;
a color-difference calculator to convert the color component values of said input image into first and second color-difference component values;
a clip value determiner to determine at least one clip value from the first and second color-difference component values obtained by the conversion at said color-difference calculator;
a clip processor to limit the first and second color-difference component values obtained by the conversion at said luminance color-difference calculator, using said at least one clip value determined by said clip value determiner; and
a color component value recoverer to convert the first and second color-difference component values limited by said clip processor, and the luminance value obtained by the conversion at said luminance color-difference calculator, into color component values, wherein
each of said pixel interpolation devices is the pixel interpolation device as set forth in claim 1, and performs interpolation using the corresponding color component values as the pixel values.

12. The image processing device as set forth in claim 11, wherein said at least one clip value determined by said clip value determiner includes an upper clip value and a lower clip value.

13. The image processing device as set forth in claim 11, wherein said clip value determiner determines said at least one clip value from the first and second color-difference component values obtained by the conversion at said color-difference calculator for the pixels in a predetermined area in said input image.

14. The image processing device as set forth in claim 13, wherein said predetermined area is an area consisting of pixels in a neighborhood of said missing pixel.

15. The image processing device as set forth in claim 11, wherein
said first color-difference component value obtained by the conversion at said luminance color-difference calculator, as well as said first color-difference component value obtained by the conversion at said color-difference calculator is a Cb component value, and
said second color-difference component value obtained by the conversion at said luminance color-difference calculator, as well as said second color-difference component value obtained by the conversion at said color-difference calculator is a Cr component value.

16. A pixel interpolation method comprising:
performing a plurality of interpolation calculation processes each interpolating a pixel value of a missing pixel in an input image, based on pixel values of pixels constituting said input image;
wherein
each of said plurality of interpolation calculation processes interpolates the pixel value of said missing pixel, and outputs the interpolated pixel value as an interpolation candidate value, treats a plurality of non-missing pixels in a vicinity of said missing pixel as test pixels, interpolates a pixel value of each of said test pixels, and outputs the interpolated pixel value as a test interpolated value of the test pixel,
the interpolation of said test pixels is performed in a same interpolation method as the interpolation of said missing pixel,
said plurality of interpolation calculation processes include a first group of interpolation calculation processes, and a second group of interpolation calculation processes,
said first group of interpolation calculation processes perform the interpolation by mean preserving interpolation calculation,
said first group of interpolation calculation processes differ from each other in a number of pixels referenced,
said second group of interpolation calculation processes perform the interpolation by interpolation calculation different from said mean preserving interpolation calculation,
said second group of interpolation calculation processes differ from each other in at least one of an interpolation calculation method and a number of pixels referenced,
said pixel interpolation method further comprises:
calculating error index values pertaining to respective interpolation calculation processes, based on absolute difference values between said test interpolated values pertaining to the respective test pixels in the vicinity of each missing pixel, and the pixel values of the test pixels, and selecting one of the plurality of interpolation calculation processes based on the calculated error index values, and selecting, for each missing pixel, the interpolation candidate value outputted from the selected interpolation calculation process, among the interpolation candidate values outputted from the plurality of interpolation calculation processes, and outputting the selected interpolation candidate value.

17. A non-transitory computer-readable recording medium storing a program for causing a computer to execute processes in the pixel interpolation method as set forth in claim 16.

* * * * *